United States Patent Office 3,358,654
Patented Dec. 19, 1967

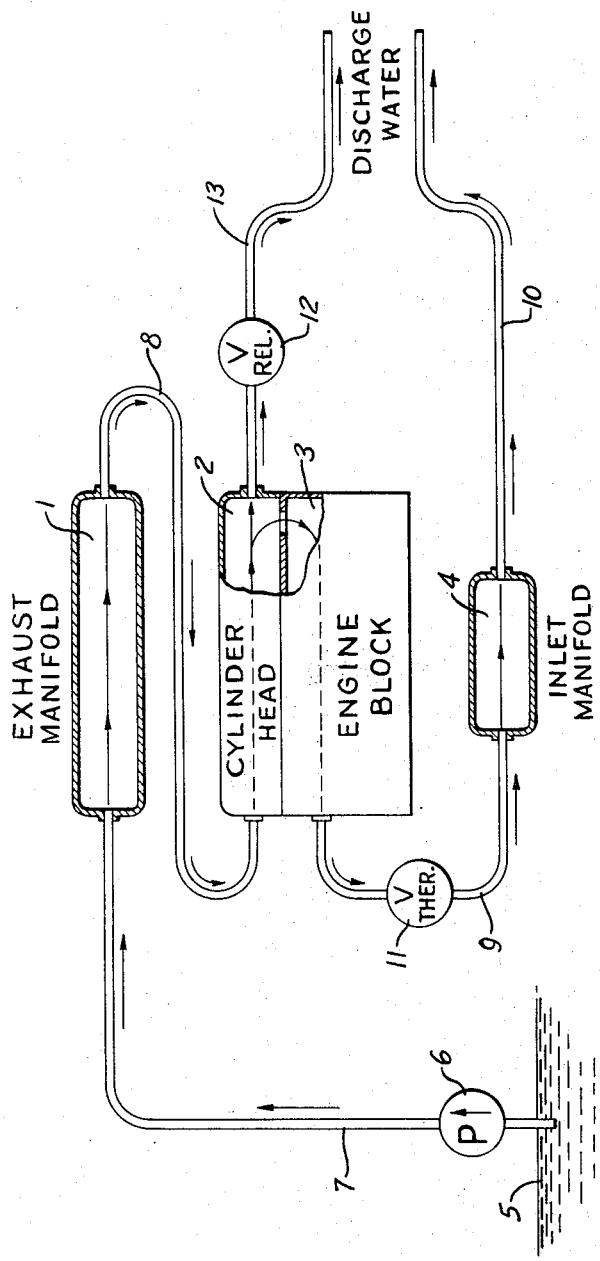

3,358,654
ENGINE COOLING SYSTEM
Robert J. Shanahan, Neenah, and Max K. Winkler, Oshkosh, Wis., assignors to Kiekhaefer Corporation, Fond du Lac, Wis., a corporation of Delaware
Filed Feb. 23, 1965, Ser. No. 434,187
2 Claims. (Cl. 123—41.08)

This invention relates to an engine cooling system adapted principally to marine engines wherein a plentiful supply of water is available.

Recirculation of water in the engine block and cylinder head has generally been the practice in order to obtain a quick warm-up at the start of the engine. Escape of water from the recirculating system was generally controlled by a thermostatically regulated valve. The added pump required for recirculation is generally costly.

The present invention eliminates the recirculating system and its pump, and in place thereof the system utilizes a supply that is always greater than that needed, with pressure relief means for the excess water.

In carrying out the invention the thermostat regulating valve is located at the discharge end where the heated water emerges from the engine, and the pressure relief valve is located between the supply and the thermostat valve and generally at the discharge from the engine head.

By locating the relief valve at the exit from the engine head and ahead of the passages in the engine block, the entire flow of cold water goes through the head, thus keeping the valves and cylinder port passages at a more normal temperature.

The accompanying drawing illustrates schematically the cooling system and its several components and which constitutes the best mode presently contemplated for carrying out the invention.

Referring to the drawing, the system comprises in general heat exchange means consisting of coolant passages 1 through a jacket around the exhaust manifold, coolant passages 3 through the engine block around the cylinders, and heating passages 4 through a jacket around the inlet manifold.

Water is generally supplied to the heat exchange passages 1, 2, 3 and 4 from the lake or stream upon which the bloat floats, indicated as 5, by means of the water supply pump 6 in line 7 leading to the exhaust manifold heat exchanger passage 1.

The water leaving passage 1 flows through line 8 to heat exchange passage 2 where it enters the cylinder head to cool it.

From the cylinder head passage 2 the water flows directly into the engine block heat exchange passage 3.

From passage 3 the water flows through line 9 to the inlet manifold passage 4.

From heat exchange passage 4 the water is discharged through line 10 back into the lake, stream or other body of water 5 upon which the boat floats.

The pump 6 is of a capacity which will supply a greater quantity of water to the system at all times than will be necessary for thermal cooling of the engine at maximum speed and load.

A thermostatically controlled regulating valve 11 is disposed in line 9 near the exit or discharge for heat exchange passage 3. This valve regulates the flow of water through the passages 1 to 4 in accordance with the temperature of the water leaving the engine block.

Initially, valve 11 permits a minimum flow of water when the engine is first started, and as the water becomes heated the valve opens gradually until it reaches a maximum opening at a given temperature adjustment therefor.

Since the supply of water by pump 6 is greater than the discharge permitted by valve 11, it is desirable to provide a relief means such as pressure relief valve 12 which in a broad sense may be connected to the system anywhere between pump 6 and valve 11. In the specific construction illustrated the pressure relief valve 12 is connected in a discharge line 13 leading from the discharge end of cylinder head passage 2. By locating valve 12 at the exit from the head passage 2, the entire supply of cold water is always flowing through the head to assure adequate cooling of the upper end of the cylinders including the valves and port passages.

Relief valve 12 is generally adjustable although, for any given engine system it need not be. The valve 12 is a normally shut valve which opens when subjected to a predetermined pressure which should be sufficiently high to insure that the passages 1 to 3 remain full of water under all flow conditions through valve 11.

By providing valve 12 ahead of the engine block passage 3 the valve is subjected to water of lower temperature than the water at valve 11 and thus may have less maintenance problems.

The series system here described differs substantially from recirculating systems in that there is only a continuous flow of water from a single source pump through all elements of the system serially, and there is no need for a separate recirculating pump.

By arranging the several heat exchangers in series it is possible to utilize a continuous supply of water flowing constantly in one direction through the system.

Various modes of carrying out the invention are contemplated as being within the scope of the following claims particularly pointing out and distinctly claiming the subject matter which is regarded as the invention.

We claim:

1. In an engine cooling system having separate heat exchange passages for the engine block, cylinder head, exhaust manifold and inlet manifold, means connecting said heat exchange passages serially with the exhaust manifold passage first the cylinder head passages second the engine block passages third and the inlet manifold passage last, means to supply a continuous flow of water through said serially connected passages, temperature responsive means regulating the flow of water from the engine block to the inlet manifold with a minimum of flow when the water is cold and a maximum of flow when the water reaches a predetermined temperature, and pressure relief means connected to the system between said cylinder head passages and said engine block passages to discharge excess water from the system while providing flow of the entire water supply through the exhaust manifold passages and the cylinder head passages at all times, said supply means having a capacity substantially greater than the maximum flow permitted by said temperature responsive means.

2. In an engine cooling system having separate heat exchange passages for the engine block and the cylinder head, means supplying a continuous flow of cold water to the cylinder head passage, means discharging the water from said cylinder head passage into said engine block passage, temperature responsive means regulating the discharge of water from said engine block passage with a minimum of flow when the water is cold and a maximum of flow when the water reaches a predetermined temperature, and pressure relief means connected to said second named means to discharge excess water from the system.

References Cited

UNITED STATES PATENTS

| 1,361,033 | 12/1920 | Ericson | 123—41.08 |
| 2,471,533 | 5/1949 | Morgan | 123—41.08 |
| 2,478,489 | 8/1949 | Kelson | 123—41.08 |
| 2,741,231 | 4/1956 | Watkins | 123—41.08 |
| 2,757,650 | 8/1956 | Holley | 123—41.31 X |

AL LAWRENCE SMITH, Primary Examiner.